(12) United States Patent
Ishikawa et al.

(10) Patent No.: US 10,904,060 B2
(45) Date of Patent: Jan. 26, 2021

(54) PEAK SUPPRESSION CIRCUIT, PEAK SUPPRESSION METHOD, AND TRANSMITTER

(71) Applicant: FUJITSU LIMITED, Kawasaki (JP)

(72) Inventors: Hiroyoshi Ishikawa, Kawasaki (JP); Shinichiro Kobayashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/529,455

(22) Filed: Aug. 1, 2019

(65) Prior Publication Data

US 2020/0076661 A1   Mar. 5, 2020

(30) Foreign Application Priority Data

Aug. 31, 2018 (JP) ................................ 2018-163181

(51) Int. Cl.
*H04B 1/04* (2006.01)
*H04L 27/26* (2006.01)

(52) U.S. Cl.
CPC ....... *H04L 27/2614* (2013.01); *H04B 1/0475* (2013.01); *H04L 27/2626* (2013.01); *H04B 2001/045* (2013.01); *H04B 2001/0425* (2013.01)

(58) Field of Classification Search
CPC ............ H04L 27/2614; H04L 27/2626; H04B 2201/70706; H04B 1/0475; H04B 2201/045

See application file for complete search history.

(56) References Cited

U.S. PATENT DOCUMENTS

| 7,839,949 B2 * | 11/2010 | Hamada .............. H04L 27/2624 375/296 |
| 2007/0120724 A1 | 5/2007 | Hori et al. |
| 2008/0200133 A1 | 8/2008 | Nagatani et al. |
| 2009/0245414 A1* | 10/2009 | Okada .................... H04B 1/707 375/295 |

FOREIGN PATENT DOCUMENTS

| JP | 2003-124824 A | 4/2003 |
| JP | 2007-150640 A | 6/2007 |
| JP | 2013-042232 A | 2/2013 |
| WO | WO-2007/036978 A1 | 4/2007 |

* cited by examiner

*Primary Examiner* — Rahel Guarino
(74) *Attorney, Agent, or Firm* — Arent Fox LLP

(57) ABSTRACT

A peak suppression circuit includes a memory, and a processor coupled to the memory and the processor configured to suppress a first peak of a transmission signal according to a first sampling signal having a predetermined period, delay the transmission signal where the first peak is suppressed by a predetermined time corresponding to a period shorter than the predetermined period, and suppress a second peak of the delayed transmission signal according to a second sampling signal having the predetermined period.

6 Claims, 15 Drawing Sheets

PEAK SUPPRESSION CIRCUIT, PEAK SUPPRESSION METHOD, AND TRANSMITTER

CROSS-REFERENCE TO RELATED APPLICATION

This application is based upon and claims the benefit of the prior Japanese Patent Application No. 2018-163181, filed on Aug. 31, 2018, the entire contents of which are incorporated herein by reference.

FIELD

The embodiments discussed herein are related to a peak suppression circuit, a peak suppression method, and a transmitter.

BACKGROUND

In a wireless communication, an amplifier that amplifies a transmission signal has a higher power efficiency as the amplifier operates at an amplification rate of a region close to saturation. However, in a case where a signal with a high PAPR (Peak to Average Power Ratio), such as an orthogonal frequency division multiplexing (OFDM) signal, is amplified, since a large backoff is made, the power efficiency of the amplifier is reduced.

As a method of improving a power efficiency of an amplifier, for example, suppressing the peak of a transmission signal in advance before being input to the amplifier has been examined. In order to improve the performance of peak suppression of the transmission signal, in some cases, there may be a multi-stage configuration in which a peak suppressing circuit is connected in series.

Related techniques are disclosed in, for example, International Publication Pamphlet No. WO2007/036978.

SUMMARY

According to an aspect of the embodiments, a peak suppression circuit includes a memory, and a processor coupled to the memory and the processor configured to suppress a first peak of a transmission signal according to a first sampling signal having a predetermined period, delay the transmission signal where the first peak is suppressed by a predetermined time corresponding to a period shorter than the predetermined period, and suppress a second peak of the delayed transmission signal according to a second sampling signal having the predetermined period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since the peak suppression of a transmission signal is performed at a signal processing speed at which a waveform of the transmission signal may be reproduced (e.g., several times or more the bandwidth of the transmission signal), power consumption of a circuit that performs the peak suppression increases. Along with a recent increase of communication traffic, a broadbanding of the transmission signal is progressing. Therefore, when the peak suppression is performed, the power consumption is further increased.

Hereinafter, embodiments of a technology that makes it possible to reduce power consumption at the time of peak suppression will be described in detail with reference to the accompanying drawings. The following embodiments do not limit the disclosed technology. The embodiments may be properly combined with each other in a range where processing contents do not contradict each other.

First Embodiment

[Transmitter 10]

Figure 1:
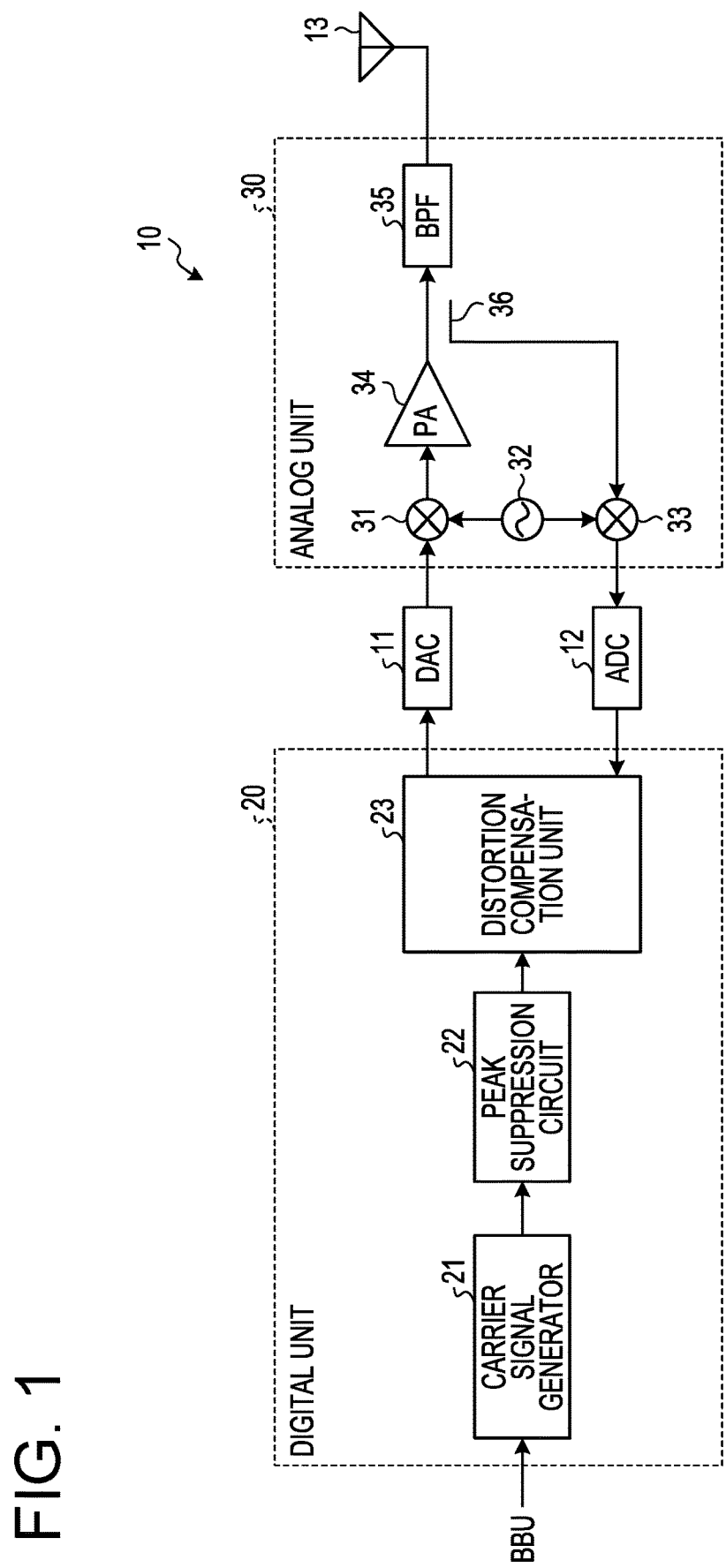
FIG. 1 is a block diagram illustrating an example of a transmitter.

FIG. 1 is a block diagram illustrating an example of a transmitter 10. For example, as illustrated in FIG. 1, the transmitter 10 includes a digital-to-analog converter (DAC) 11, an analog-to-digital converter (ADC) 12, an antenna 13, a digital unit 20, and an analog unit 30. The transmitter 10 is implemented as, for example, a remote radio head (RRH) in a base station device including a base band unit (BBU) and the RRH.

The DAC 11 converts a transmission signal output from the digital unit 20, from a digital signal to an analog signal. Then, the DAC 11 outputs the transmission signal converted into the analog signal, to the analog unit 30. The ADC 12 converts a transmission signal fed back from the analog unit 30, from an analog signal to a digital signal. Then, the ADC 12 outputs the transmission signal converted into the digital signal, to the digital unit 20.

The digital unit 20 includes a carrier signal generator 21, a peak suppression circuit 22, and a distortion compensation unit 23. The carrier signal generator 21 performs a processing such as a waveform shaping and a frequency shifting, on the transmission signal output from the BBU. The carrier signal generator 21 outputs the transmission signal subjected to the processing such as the waveform shaping and the frequency shifting, to the peak suppression circuit 22. The peak suppression circuit 22 suppresses the peak of the transmission signal output from the carrier signal generator 21.

The distortion compensation unit 23 compensates for the distortion of a power amplifier (PA) included in the analog unit 30, on the basis of a distortion compensation factor corresponding to the transmission signal fed back via the ADC 12. For example, the distortion compensation unit 23 performs an operation based on the distortion compensation factor that imparts a characteristic reverse to a non-linear characteristic of the PA to the transmission signal, on the transmission signal output from the peak suppression circuit 22 so as to compensate for the distortion of the PA. Then, the distortion compensation unit 23 outputs the transmission signal where the distortion is compensated, to the analog unit 30 via the DAC 11.

The analog unit 30 includes an up converter 31, an oscillator 32, a down converter 33, a PA 34, a band pass filter (BPF) 35, and a coupler 36. The up converter 31 up-converts the transmission signal output from the DAC 11 by using a local oscillation signal from the oscillator 32, at a predetermined frequency. The PA 34 amplifies the transmission signal up-converted by the up converter 31. The BPF 35 limits a frequency band of the transmission signal amplified by the PA 34 to a predetermined frequency band. The antenna 13 radiates the transmission signal with the band limited by the BPF 35, to a space.

The coupler 36 feeds back a part of the transmission signal amplified by the PA 34, to the down converter 33. The down converter 33 down-converts the transmission signal fed back from the coupler 36, by using the local oscillation signal from the oscillator 32. The transmission signal down-converted by the down converter 33 is fed back to the distortion compensation unit 23 via the ADC 12.

[Peak Suppression Circuit 22]

Figure 2:
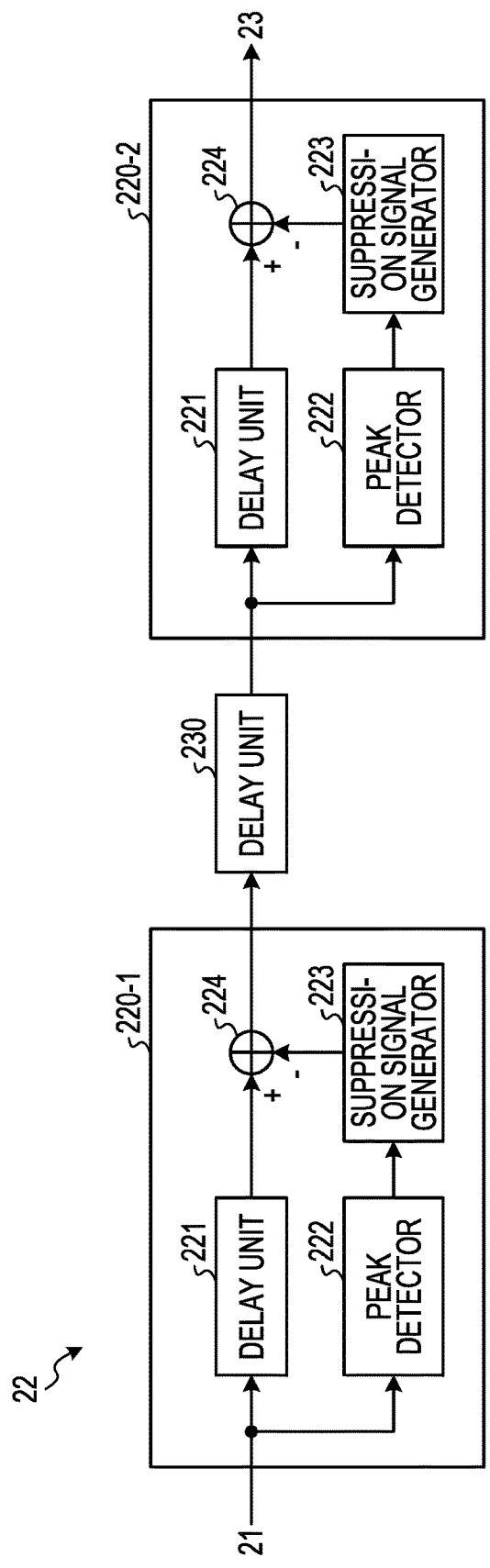
FIG. 2 is a block diagram illustrating an example of a peak suppression circuit according to a first embodiment.

FIG. 2 is a block diagram illustrating an example of the peak suppression circuit 22 in the first embodiment. The peak suppression circuit 22 in the embodiment includes a peak suppression unit 220-1, a peak suppression unit 220-2, and a delay unit 230. The peak suppression unit 220-1 is an example of a first suppressor, and the peak suppression unit 220-2 is an example of a second suppressor. The peak suppression unit 220-1 performs a peak suppression of a transmission signal by using samples having a predetermined period included in the transmission signal (hereinafter, also referred to as data signals). The transmission signal treated in wireless communication is a complex number, and a processing of the peak suppression is also treated with a complex number. In the embodiment, the "predetermined period" is, for example, a period that is twice a sampling period $T_S$ of the transmission signal.

The delay unit 230 delays the transmission signal where the peak is suppressed by the peak suppression unit 220-1 at a period shorter than the predetermined period, by a predetermined time. The delay unit 230 may be configured by, for example, an FIR filter (or an IIR filter). The delay unit 230 interpolates the data signal during the predetermined period. Accordingly, the data signal in the predetermined time is interpolated. In the embodiment, the "predetermined time" is, for example, a time having ½ the length of the "predetermined period." In the embodiment, the time having ½ the length of the "predetermined period" is a time having the same length as the sampling period $T_S$ of the transmission signal.

The peak suppression unit 220-2 further performs a peak suppression of the transmission signal whose peak is suppressed by the peak suppression unit 220-1, by using samples having a predetermined period included in the transmission signal delayed by the delay unit 230. The delayed samples having the predetermined period are data signals interpolated by the delay unit 230, and are data signals obtained by delaying the signal whose peak is suppressed by the peak suppression unit 220-1 by the predetermined time. The peak suppression unit 220-2 performs the peak suppression of the transmission signal by using samples different from the samples used in the peak suppression by the peak suppression unit 220-1. In the embodiment, the peak suppression unit 220-1 and the peak suppression unit 220-2 have the same structures. In the following, when collectively referred to without distinction, the peak suppression units 220-1 and 220-2 are described as a peak suppression unit 220.

Each peak suppression unit 220 includes a delay unit 221, a peak detector 222, a suppression signal generator 223, and a synthesis unit 224. The delay unit 221 delays the input transmission signal by a processing time of the peak detector 222 and the suppression signal generator 223.

The peak detector 222 monitors the peak of an amplitude of the input transmission signal, and detects the timing of the peak that exceeds a predetermined threshold and the amplitude of the peak with respect to the predetermined threshold. Then, the peak detector 222 outputs the detected timing of the peak, and information on the amplitude with respect to the threshold, to the suppression signal generator 223. The peak detector 222 is an example of a detector.

The suppression signal generator 223 sets the timing output from the peak detector 222, as a peak, and generates a suppression signal having an amplitude corresponding to the information on the amplitude output from the peak detector 222. The suppression signal generator 223 generates, for example, a signal in an impulse response waveform having the amplitude output from the peak detector 222 in synchronization with the timing output from the peak detector 222, as the suppression signal. The signal in the impulse response waveform may be obtained by causing, for example, a unit impulse signal to pass through a low pass filter having a band of the transmission signal as a pass band. The suppression signal generator 223 is an example of a generator.

The suppression signal generator 223 may refer to a lookup table in a memory in which suppression signals at different timings and amplitudes are stored in advance so as to acquire a suppression signal corresponding to the information output from the peak detector 222.

The synthesis unit 224 synthesizes the transmission signal delayed by the delay unit 221, with the suppression signal generated by the suppression signal generator 223 so as to suppress the peak of the transmission signal. Then, the synthesis unit 224 outputs the peak-suppressed transmission signal.

Figure 3:
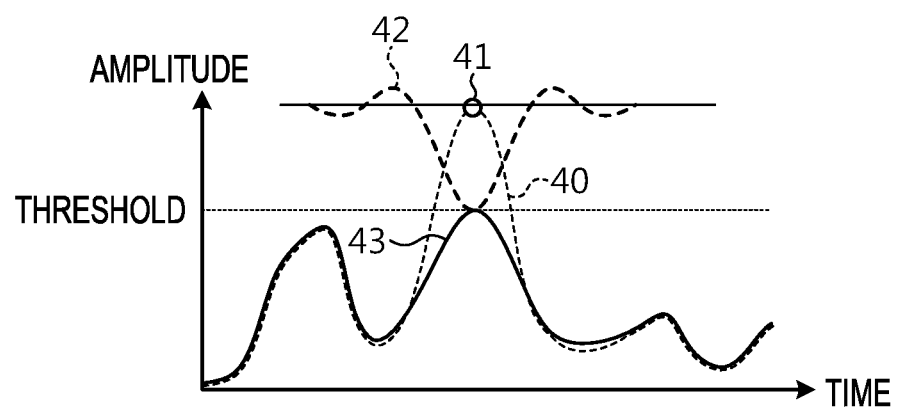
FIG. 3 is a view for explaining an example of a process of peak suppression.

FIG. 3 is a view for explaining an example of a process of peak suppression. For example, as illustrated in FIG. 3, with respect to a transmission signal 40 input to the peak suppression unit 220, the suppression signal generator 223 generates a suppression signal 42 having an amplitude corresponding to an amplitude of a peak 41, in synchronization with a timing of the peak 41 with the amplitude exceeding a predetermined threshold. The synthesis unit 224 synthesizes the transmission signal 40 with the suppression signal 42. Accordingly, the suppression signal 42 is subtracted from the transmission signal 40, and a transmission signal 43 in which the peak with the amplitude is suppressed to fall within a range of the predetermined threshold is generated.

Figure 4:
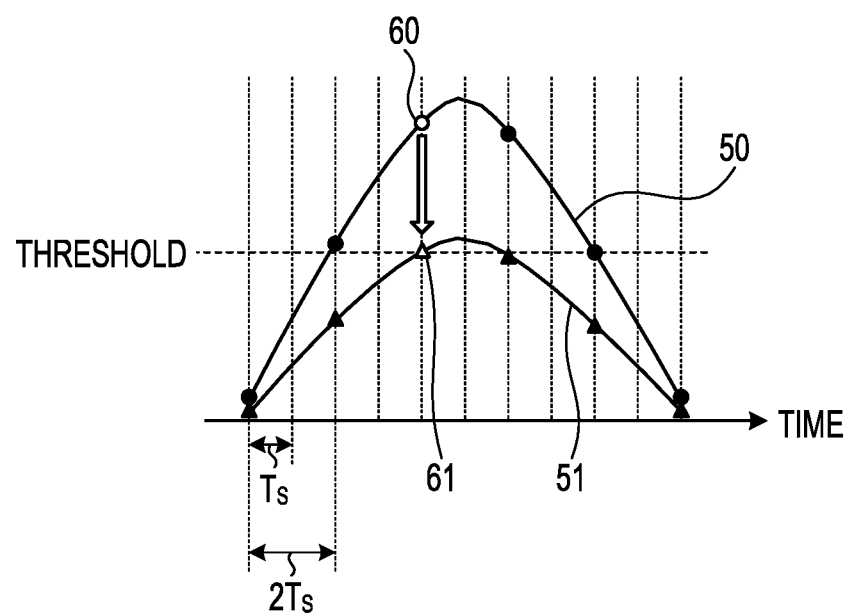
FIG. 4 is a view for explaining an example of a process of peak suppression by a peak suppression unit in a first stage.

Here, in the peak suppression unit 220-1, for example, as illustrated in FIG. 4, a peak of a transmission signal 50 is suppressed by using samples with a period $2T_S$ included in the transmission signal 50 sampled at a period $T_S$. FIG. 4 is a view for explaining an example of a process of peak suppression by the peak suppression unit 220-1 in the first stage. In the example of FIG. 4, among the samples with the period $2T_S$ included in the transmission signal 50, a sample indicated by a white circle is detected as a peak 60 of the transmission signal 50.

Then, the transmission signal 50 is synthesized with a suppression signal with a timing and an amplitude corresponding to the peak 60 indicated by the white circle in FIG. 4 so that a transmission signal 51 in which the peak 60 is suppressed to a peak 61 below a threshold is generated.

However, for example, as illustrated in FIG. 4, when there is a peak in samples different from the samples with the period $2T_S$ included in the transmission signal 50 (the samples indicated by the white circle and black circles in FIG. 4), in some cases, even in the transmission signal 51 whose peak is suppressed, a peak equal to or higher than the threshold may remain.

Therefore, in the peak suppression circuit 22 of the embodiment, the transmission signal 51 where the peak is suppressed by the peak suppression unit 220-1 is delayed by the delay unit 230 by a predetermined time so that the peak of the transmission signal 51 is further suppressed by the peak suppression unit 220-2. The predetermined time is shorter than a "predetermined period" that is the period of the samples used in the peak suppression by the peak suppression unit 220-1, and is, for example, a time having the same length as the period $T_S$.

Figure 5:
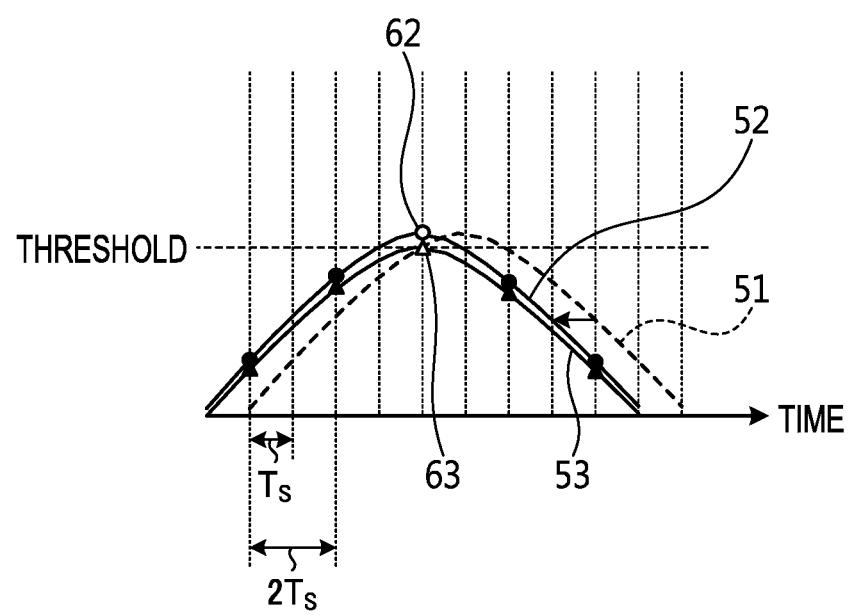
FIG. 5 is a view for explaining an example of a process of peak suppression by a peak suppression unit in a second stage.

FIG. 5 is a view for explaining an example of a process of peak suppression by the peak suppression unit 220-2 in the second stage. A transmission signal 52 is a signal obtained by delaying the transmission signal 51 where the peak is suppressed by the peak suppression unit 220-1, by the delay unit 230 by the predetermined time. The peak suppression unit 220-2 performs the peak suppression by using samples having the same period $2T_S$ (samples indicated by a white circle and black circles in FIG. 5) as that in the peak suppression unit 220-1, in the transmission signal 52.

Since the transmission signal 51 is delayed by the delay unit 230 by the predetermined time, the peak suppression unit 220-2 may perform the peak suppression by using samples different from the samples of the transmission signal used by the peak suppression unit 220-1. Accordingly, for example, as illustrated in FIG. 5, the peak suppression unit 220-2 may detect a peak 62 of the transmission signal 52, which is not detected by the peak suppression unit 220-1.

Then, the transmission signal 52 is synthesized with a suppression signal with a timing and an amplitude corresponding to the peak 62 so that a transmission signal 53 in which the peak 62 is suppressed to a peak 63 below the threshold is generated. Accordingly, the peak suppression may be performed by using the samples with a period longer than the sampling period $T_S$ of the transmission signal. Therefore, it is possible to reduce a processing speed in the peak suppression, and to reduce power consumption at the time of the peak suppression.

Figure 6:
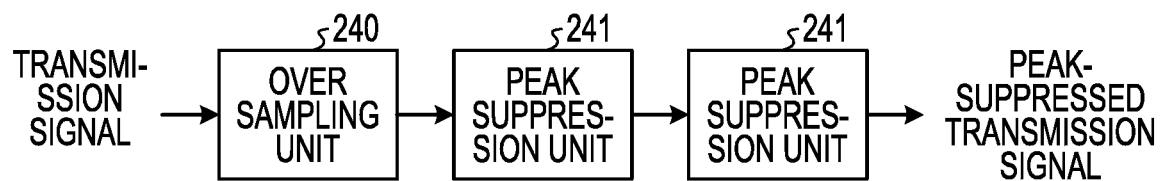
FIG. 6 is a block diagram illustrating an example of a peak suppression circuit according to Comparative Example 1.

Hereinafter, descriptions will be made on the performance of peak suppression performed by the peak suppression circuit 22 of the first embodiment, through a comparison with a peak suppression circuit according to Comparative Example 1 and a peak suppression circuit according to Comparative Example 2. FIG. 6 is a block diagram illustrating an example of a peak suppression circuit according to Comparative Example 1. The peak suppression circuit according to Comparative Example 1 includes an over sampling unit 240 and two peak suppression units 241. The over sampling unit 240 performs a processing of increasing a time sampling rate of a transmission signal. Each of the peak suppression units 241 suppresses a peak of the transmission signal, for all samples included in the transmission signal sampled at a period $T_S$. The peak suppression circuit according to Comparative Example 1 performs a processing at a higher speed than the peak suppression circuit 22 of the first embodiment, and thus, the power consumption is large.

Here, since a plurality of signals is superimposed on the transmission signal, the amplitude of the transmission signal changes in a complicated manner. Therefore, even when the peak suppression is performed for all samples included in the transmission signal sampled at the period $T_S$, it is difficult to suppress all the peaks below a threshold by performing the peak suppression only once. Therefore, by performing the peak suppression on the transmission signal multiple times, it is possible to further reduce the peak of the transmission signal.

Figure 7:
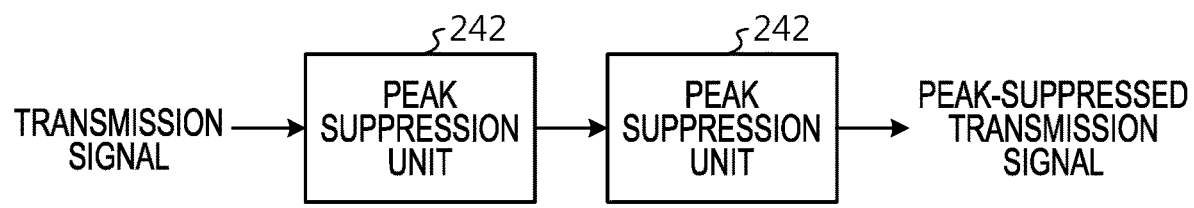
FIG. 7 is a block diagram illustrating an example of a peak suppression circuit according to Comparative Example 2.

FIG. 7 is a block diagram illustrating an example of a peak suppression circuit according to Comparative Example 2. The peak suppression circuit of Comparative Example 2 includes two peak suppression units 242. Each of the peak suppression units 242 suppresses a peak of a transmission signal for samples with a period $2T_S$ among samples included in the transmission signal sampled at a period $T_S$. The peak suppression circuit of Comparative Example 2 is different from the peak suppression circuit 22 of the first embodiment in that the delay unit 230 is not included, but the power consumption of the delay unit 230 is sufficiently lower than that of the peak suppression unit 220. Therefore, the power consumption of the peak suppression circuit of Comparative Example 2 is substantially equal to the power consumption of the peak suppression circuit 22 in the first embodiment.

Figure 8:
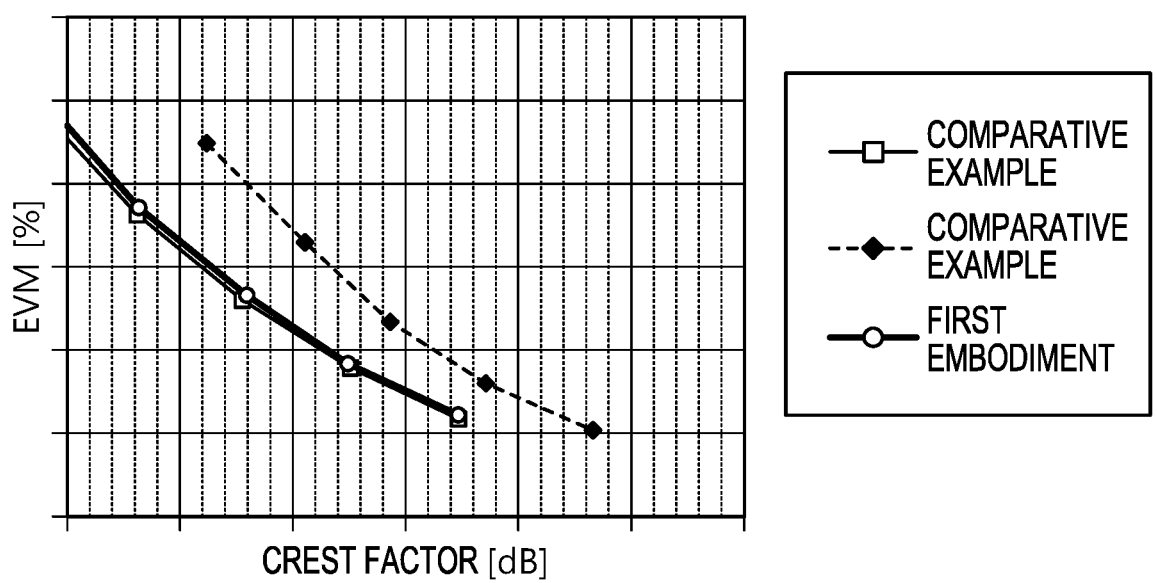
FIG. 8 is a view illustrating an example of a Crest factor of a transmission signal whose peak is suppressed.

FIG. 8 is a view illustrating an example of a Crest factor of a transmission signal where the peak is suppressed. In a comparison between Comparative Example 1 and the first embodiment, when the same error vector magnitudes (EVMs) are implemented, crest factors are substantially equal. That is, in the peak suppression circuit of Comparative Example 1 and the peak suppression circuit 22 of the first embodiment, peak suppression performances on the transmission signal are equal. However, the peak suppression circuit of Comparative Example 1 consumes more power than the peak suppression circuit 22 of the first embodiment. Thus, the peak suppression circuit 22 of the first embodiment may achieve a peak suppression performance equal to that of the peak suppression circuit of Comparative Example 1, and may consume less power than the peak suppression circuit of Comparative Example 1.

When the peak suppression circuit of Comparative Example 1 is implemented by a single peak suppression unit 241, power consumption of the peak suppression circuit of Comparative Example 1 is substantially equal to that of the peak suppression circuit 22 of the first embodiment. However, when the same EVMs are implemented, the Crest factor of the peak suppression circuit of Comparative Example 1 implemented by the single peak suppression unit 241 becomes a value between the Crest factor of the peak suppression circuit 22 of the first embodiment and the Crest factor of Comparative Example 2. Therefore, the peak suppression circuit of Comparative Example 1 implemented by the single peak suppression unit 241 has a lower peak suppression performance than the peak suppression circuit 22 of the first embodiment.

The power consumption of the peak suppression circuit of Comparative Example 2 is substantially equal to that of the peak suppression circuit 22 of the first embodiment. However, referring to FIG. 8, when the same EVMs are implemented, the Crest factor in Comparative Example 2 is larger than that in the first embodiment. Therefore, the peak suppression circuit of Comparative Example 2 has a lower peak suppression performance of the transmission signal than the peak suppression circuit 22 of the first embodiment. Therefore, when the peak suppression circuit of Comparative Example 2 is used, since it is necessary to make a backoff of the PA 34 to be large, the power efficiency is low and the power consumption of the transmitter 10 as a whole is large as compared to that in a case where the peak suppression circuit 22 of the first embodiment is used. The peak suppression circuit 22 of the first embodiment may achieve a good peak suppression performance which is equal to that in Comparative Example 1 with the same power consumption as that of the peak suppression circuit of Comparative Example 2.

As described above, the peak suppression circuit 22 of the first embodiment may achieve a low power consumption while maintaining the peak suppression performance.

[Peak Suppression Processing]

Figure 9:
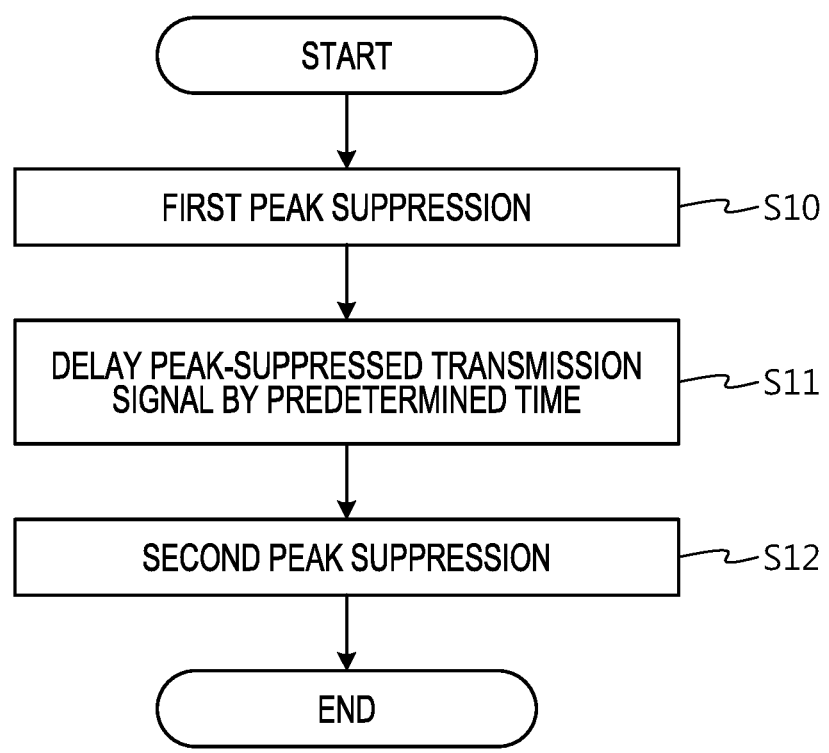
FIG. 9 is a flowchart illustrating an example of a peak suppression processing in the first embodiment.

FIG. 9 is a flowchart illustrating an example of a peak suppression processing in the first embodiment. The peak suppression circuit 22 executes a processing illustrated in the present flowchart, for, for example, each predetermined number of samples included in a transmission signal sampled at a period $T_S$.

First, the peak suppression unit 220-1 performs a first peak suppression on the transmission signal by using samples having a predetermined period included in the transmission signal (S10). Then, the peak suppression unit 220-1 outputs the peak-suppressed transmission signal to the delay unit 230.

Next, the delay unit 230 delays the transmission signal where the peak is suppressed by the peak suppression unit 220-1 at a period shorter than the predetermined period, by a predetermined time (S11). Then, the delay unit 230 outputs the peak-suppressed transmission signal delayed by the predetermined time to the peak suppression unit 220-2.

Next, the peak suppression unit 220-2 performs a second peak suppression on the transmission signal where the peak is suppressed by the first peak suppression by using samples having a predetermined period included in the transmission signal delayed by the delay unit 230 (S12). In operation S12, the peak suppression unit 220-2 performs the second peak suppression by using samples different from the samples used in the first peak suppression. Then, the peak suppression unit 220-2 outputs the peak-suppressed transmission signal to the distortion compensation unit 23.

The first embodiment has been described above. The transmitter 10 of the present embodiment includes the peak suppression circuit 22, the PA 34, and the antenna 13. The peak suppression circuit 22 suppresses the peak of a transmission signal. The PA 34 amplifies the transmission signal where the peak is suppressed by the peak suppression circuit 22. The antenna 13 transmits the transmission signal amplified by the PA 34. The peak suppression circuit 22 includes the peak suppression unit 220-1, the delay unit 230, and the peak suppression unit 220-2. The peak suppression unit 220-1 performs the peak suppression of the transmission signal by using the transmission signal at a predetermined period. The delay unit 230 delays the transmission signal where the peak is suppressed by the peak suppression unit 220-1, at a period shorter than the predetermined period, by a predetermined time. The peak suppression unit 220-2 further performs the peak suppression of the transmission signal where the peak is suppressed by the peak suppression unit 220-1 by using, as the transmission signal delayed by the delay unit 230, the transmission signal that is different from the transmission signal used in the peak suppression by the peak suppression unit 220-1, and has the predetermined period. Accordingly, it is possible to reduce the power consumption at the time of peak suppression.

In the above embodiment, each of the peak suppression unit 220-1 and the peak suppression unit 220-2 includes the peak detector 222, the suppression signal generator 223, and the synthesis unit 224. The peak detector 222 detects a timing of a peak that exceeds a predetermined threshold among the peaks of the transmission signal. The suppression signal generator 223 generates a suppression signal having a peak in synchronization with the timing detected by the peak detector 222. The synthesis unit 224 synthesizes the input transmission signal, with the suppression signal. Accordingly, it is possible to suppress the peak of the transmission signal.

Second Embodiment

Figure 10:
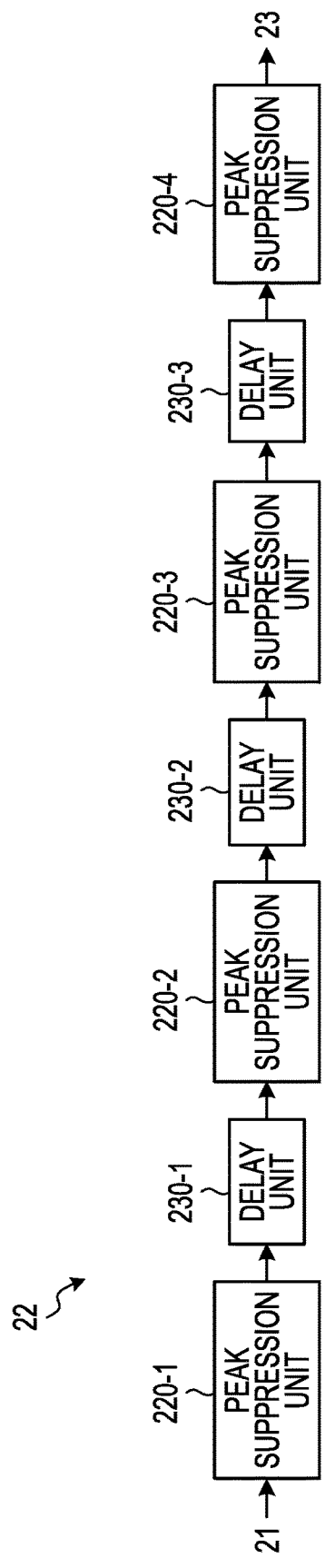
FIG. 10 is a block diagram illustrating an example of a peak suppression circuit in a second embodiment.

FIG. 10 is a block diagram illustrating an example of the peak suppression circuit 22 according to a second embodiment. The peak suppression circuit 22 of the present embodiment includes four peak suppression units 220-1 to 220-4, and three delay units 230-1 to 230-3. Hereinafter, when collectively referred to without distinction, the peak suppression units 220-1 to 220-4 are described as the peak suppression unit 220, and when collectively referred to without distinction, the delay units 230-1 to 230-3 are described as the delay unit 230.

Each peak suppression unit 220 is the same as the peak suppression unit 220 described in the first embodiment except for the points described below. Each peak suppression unit 220 in the embodiment suppresses a peak of a transmission signal by using samples having a predetermined period included in the transmission signal sampled at a period $T_S$. In the embodiment, the "predetermined period" is a period that is four times the sampling period $T_S$ of the transmission signal.

Each delay unit 230 delays the transmission signal where the peak is suppressed by the peak suppression unit 220, at a period shorter than the predetermined period, by a predetermined time. In the embodiment, the "predetermined time" is, for example, a time having ¼ of the length of the "predetermined period." The time having ¼ of the length of the "predetermined period" is a time having the same length as the sampling period $T_S$ of the transmission signal.

In the peak suppression circuit 22 of the embodiment, the peak suppression is performed four times by using samples having a period four times the sampling period $T_S$ of the transmission signal so that the transmission signal is shifted by the sampling period $T_S$ of the transmission signal between the peak suppression units 220. In the embodiment as well, it is possible to reduce the power consumption at the time of peak suppression while maintaining the peak suppression performance.

The peak suppression circuit 22 exemplified in FIG. 10 includes four peak suppression units 220 and three delay units 230, but the disclosed technology is not limited thereto. For example, the peak suppression circuit 22 may include n (n is an integer of 2 or more) peak suppression units 220 and (n−1) delay units 230. Each delay unit 230 delays a transmission signal where the peak is suppressed by a $k^{th}$ (k is an integer of 1 or more and (n−1) or less) peak suppression unit 220 by a predetermined time. Then, each delay unit 230 outputs the transmission signal delayed by the predetermined time to a $(k+1)^{th}$ peak suppression unit 220. The predetermined time is a time having 1/n of the length of a period of samples of the transmission signal used in peak suppression by each peak suppression unit 220. Accordingly, it is possible to reduce power consumption at the time of peak suppression while maintaining the peak suppression performance.

Third Embodiment

Figure 11:
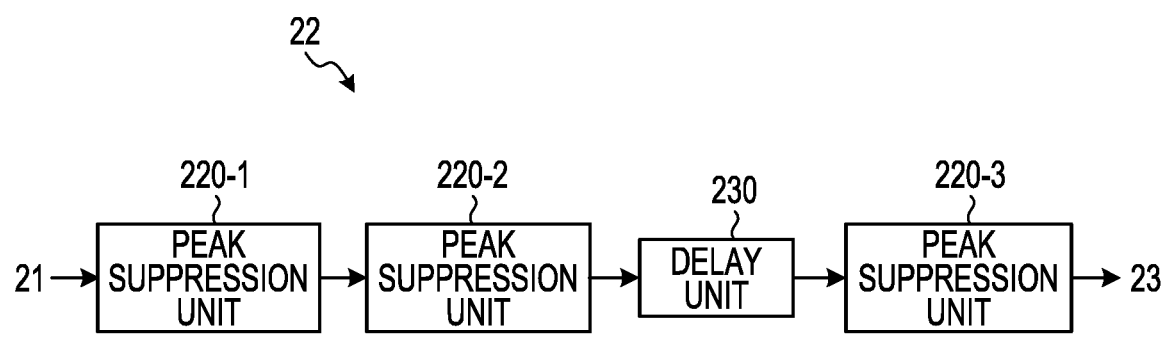
FIG. 11 is a block diagram illustrating an example of a peak suppression circuit in a third embodiment.

FIG. 11 is a block diagram illustrating an example of the peak suppression circuit 22 in a third embodiment. The peak suppression circuit 22 in the embodiment includes three peak suppression units 220-1 to 220-3, and one delay unit 230. Hereinafter, when collectively referred to without distinction, the peak suppression units 220-1 to 220-3 are described as the peak suppression unit 220.

Each peak suppression unit 220 is the same as the peak suppression unit 220 described in the first embodiment. That is, each peak suppression unit 220 in the embodiment suppresses a peak of a transmission signal by using samples having a predetermined period included in the transmission signal sampled at a period $T_S$. In the embodiment, the "predetermined period" is a period that is twice the sampling period $T_S$ of the transmission signal.

The delay unit 230 delays the transmission signal where the peak is suppressed by the peak suppression unit 220-2, at a period shorter than the predetermined period, by a predetermined time. In the embodiment, the "predetermined time" is, for example, a time having ½ of the length of the "predetermined period." The time having ½ of the length of the "predetermined period" is a time having the same length as the sampling period $T_S$ of the transmission signal.

In the embodiment, the peak suppression unit 220-1 and the peak suppression unit 220-2 perform a peak suppression twice by using transmission signal samples having a period which is twice the sampling period $T_S$. Then, the peak suppression unit 220-3 performs a peak suppression by using transmission signal samples having a period which is twice the sampling period $T_S$, for the transmission signal that has the peak suppressed by the peak suppression unit 220-2 and is delayed by the delay unit 230 by the predetermined time. Accordingly, in the present embodiment as well, it is possible to reduce the power consumption at the time of peak suppression while maintaining the peak suppression performance.

Fourth Embodiment

Figure 12:
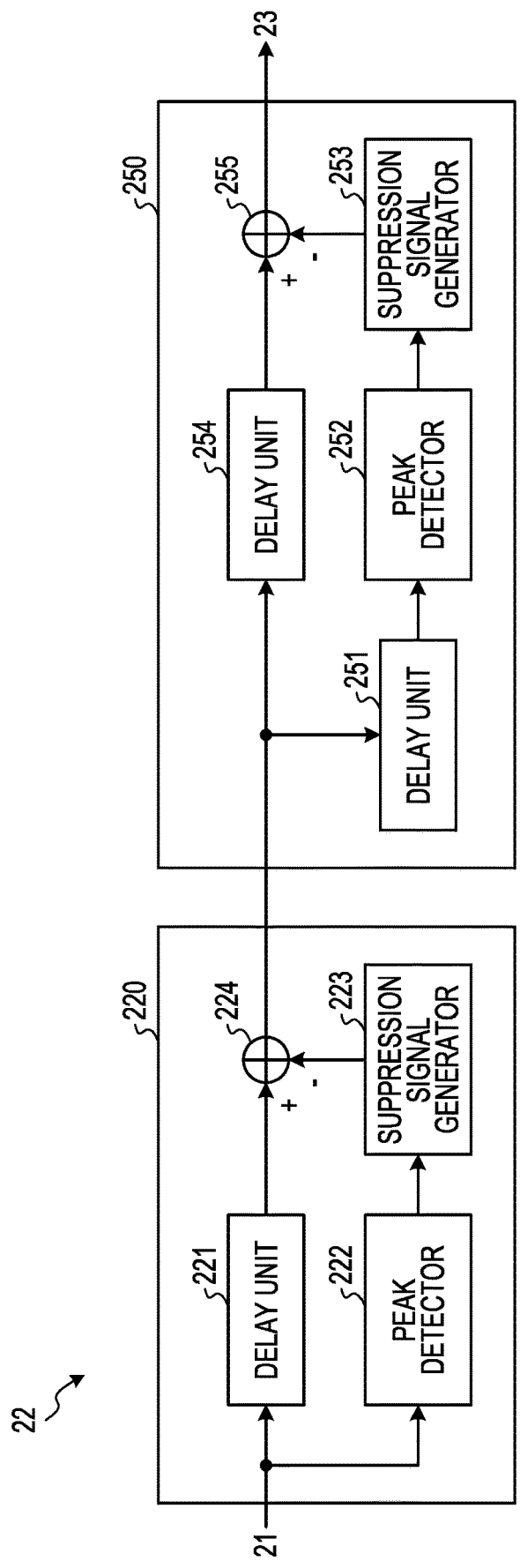
FIG. 12 is a block diagram illustrating an example of a peak suppression circuit in a fourth embodiment.

FIG. 12 is a block diagram illustrating an example of the peak suppression circuit 22 in a fourth embodiment. For example, as illustrated in FIG. 12, the peak suppression circuit 22 in the present embodiment includes the peak suppression unit 220 and a peak suppression unit 250. The peak suppression unit 220 and the peak suppression unit 250 perform a peak suppression of a transmission signal by using samples having a predetermined period included in the transmission signal. In the embodiment, the "predetermined period" is a period that is, for example, twice a sampling period $T_S$ of the transmission signal. The peak suppression unit 220 is the same as the peak suppression unit 220 described in the first embodiment, and thus, detailed descriptions thereof will be omitted.

For example, as illustrated in FIG. 12, the peak suppression unit 250 includes a delay unit 251, a peak detector 252, a suppression signal generator 253, a delay unit 254, and a synthesis unit 255.

The delay unit 251 delays the transmission signal where the peak is suppressed by the peak suppression unit 220, at a period shorter than the predetermined period by a predetermined time. In the embodiment, the "predetermined time" is, for example, a time having ½ of the length of the "predetermined period." In the embodiment, the time having ½ of the length of the "predetermined period" is a time having the same length as the sampling period $T_S$ of the transmission signal.

The peak detector 252 monitors the peak of an amplitude of the transmission signal delayed by the delay unit 251 by the predetermined time, and detects the timing of the peak that exceeds a predetermined threshold, and the amplitude of the peak with respect to the predetermined threshold. Then, the peak detector 252 outputs the detected timing of the peak and information on the amplitude with respect to the threshold, to the suppression signal generator 253.

The suppression signal generator 253 sets the timing output from the peak detector 252, as a peak, and generates a suppression signal having an amplitude corresponding to the information on the amplitude output from the peak detector 252. The suppression signal generator 253 generates, for example, a signal in an impulse response waveform having the amplitude output from the peak detector 252 in synchronization with the timing output from the peak detector 252, as the suppression signal. The delay unit 254 delays the input transmission signal by a processing time of the peak detector 252 and the suppression signal generator 253, and a delayed time in the delay unit 251.

Figure 13:
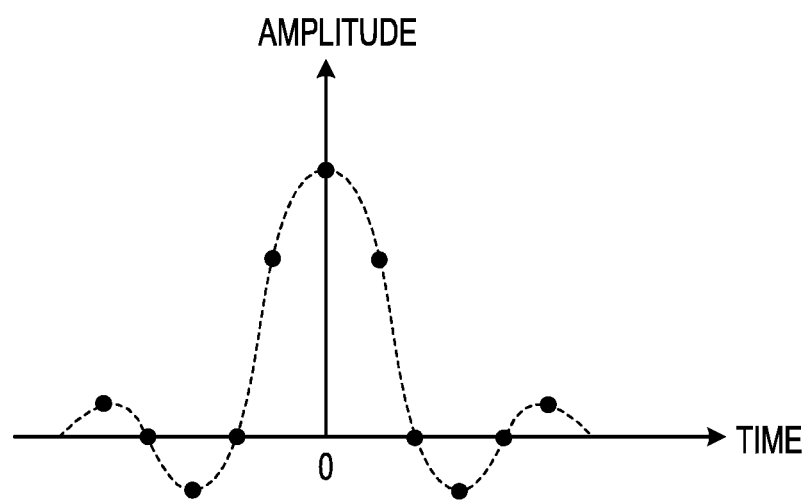
FIG. 13 is a view illustrating an example of a suppression signal generated by a suppression signal generator in the first stage.

Here, the suppression signal generator 223 in the peak suppression unit 220 in the first stage generates, for example, a suppression signal as illustrated in FIG. 13. FIG. 13 is a view illustrating an example of the suppression signal generated by the suppression signal generator 223 in the first stage. Black circles illustrated in FIG. 13 are samples of a signal in an impulse response waveform corresponding to a period twice the sampling period $T_S$ of the transmission signal.

Figure 14:
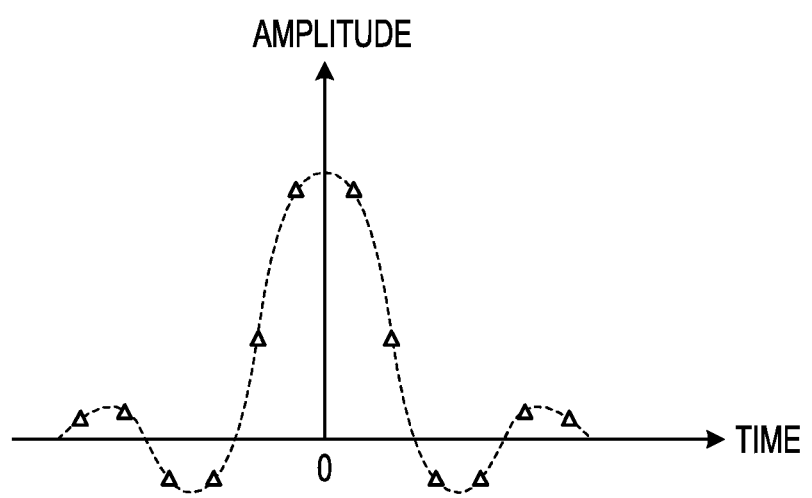
FIG. 14 is a view illustrating an example of a suppression signal generated by a suppression signal generator in the second stage.

Meanwhile, the suppression signal generator 253 in the peak suppression unit 250 in the second stage generates, for example, a suppression signal as illustrated in FIG. 14. FIG. 14 is a view illustrating an example of the suppression signal generated by the suppression signal generator 253 in the second stage. The white triangles illustrated in FIG. 14 are samples of a signal in an impulse response waveform corresponding to a period which is twice the sampling period $T_S$ of the transmission signal. The timings of the samples of the suppression signal illustrated in FIG. 14 are shifted from the timings of the samples of the suppression signal illustrated in FIG. 13 by the time delayed by the delay unit 251.

The peak detected by the peak detector 252 in the peak suppression unit 250 is a peak in the transmission signal delayed by the delay unit 251 by the predetermined time (in the embodiment, the time having the same length as the period $T_S$). Therefore, the suppression signal generator 253 generates the suppression signal for the samples delayed by the predetermined time.

In the present embodiment as well, it is possible to reduce the power consumption at the time of peak suppression while maintaining the peak suppression performance.

[Hardware]

Figure 15:
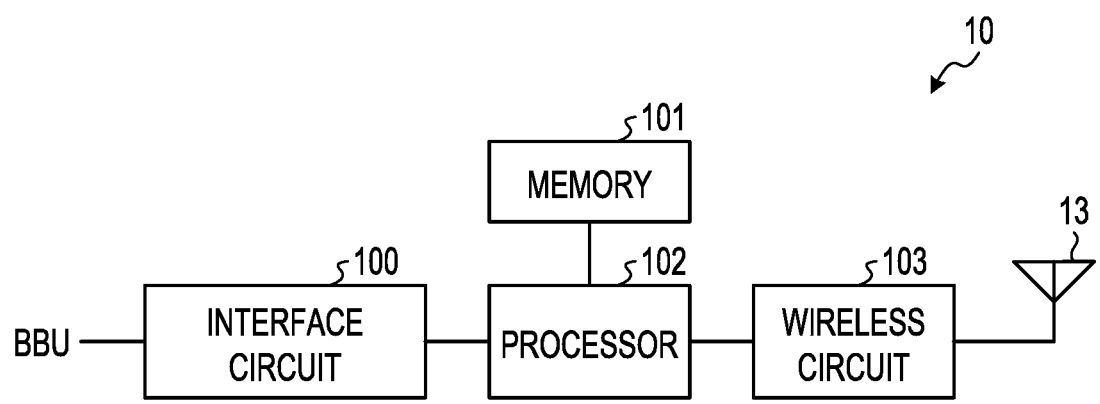
FIG. 15 is a view illustrating an example of hardware of the transmitter.

The transmitter 10 according to the above first to fourth embodiments is implemented by, for example, hardware as illustrated in FIG. 15. FIG. 15 is a view illustrating an example of hardware of the transmitter 10. The transmitter 10 includes an interface circuit 100, a memory 101, a processor 102, and a wireless circuit 103.

The interface circuit 100 is an interface that performs wired communication with the BBU. The wireless circuit 103 performs a processing such as an up-conversion on a signal output from the processor 102, and transmits the processed signal from the antenna 13. The wireless circuit 103 performs a processing such as a down-conversion on a part of a transmission signal, and feeds back the processed signal to the processor 102. The wireless circuit 103 includes, for example, the DAC 11, the ADC 12, and the analog unit 30.

The memory 101 stores, for example, various programs, etc. to implement functions of the digital unit 20. The processor 102 implements, for example, respective functions of the carrier signal generator 21, the peak suppression circuit 22, and the distortion compensation unit 23 by executing the programs read from the memory 101.

All of programs or data, etc. in the memory 101 may not be necessarily stored in the memory 101 from the beginning. For example, each program or data, etc. may be stored in a portable recording medium such as a memory card to be inserted in the transmitter 10, and then, the transmitter 10 may acquire and execute each program or data, etc. from such a portable recording medium. Otherwise, the transmitter 10 may acquire and execute each program from another computer or a server device, etc. that stores each program or data, etc. via a wireless communication line, a public line, the Internet, a LAN, a WAN, etc.

[Others]

The disclosed technology is not limited to the above embodiments, and various modifications may be made within the scope of the gist thereof.

For example, in the above embodiments, the peak suppression circuit 22 generates a suppression signal corresponding to a peak having an amplitude which is equal to or higher than a predetermined threshold in a transmission signal, and synthesizes the generated suppression signal with the transmission signal so as to suppress the peak of the transmission signal. However, the disclosed technology is not limited thereto. As another example, the peak suppression circuit 22 may clip an amplitude of a transmission signal below a predetermined threshold, and remove the high frequency component of the clipped transmission signal so as to suppress the peak of the transmission signal.

In the above second embodiment, the time by which each delay unit 230 delays a transmission signal is the same (e.g., $T_S$) among the plurality of delay units 230, but the disclosed technology is not limited thereto. That is, the time by which each delay unit 230 delays the transmission signal may be different among the plurality of delay units 230. For example, each of the delay units 230-1 to 230-3 may delay a transmission signal where the peak is suppressed by the peak suppression unit 220 in the previous stage, by a time corresponding to ½, ¼, or ½ of the length of a period of samples of the transmission signal used by the peak suppression unit 220.

In the above embodiments, the processing blocks included in the transmitter 10 are separated on a function basis according to main processing contents in order to facilitate understanding of each device in the embodiments. Therefore, the disclosed technology is not limited by a separation method of the processing blocks or the names thereof. Each processing block included in each transmitter 10 may be subdivided into more processing blocks according to the processing contents, or a plurality of processing blocks may be integrated into one processing block. A part or all of processings executed by each processing block may be implemented as processings by software, or may be implemented by dedicated hardware such as an application specific integrated circuit (ASIC).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppression circuit comprising:
a memory; and
a processor coupled to the memory and the processor configured to:
suppress a first peak of a transmission signal according to a first sampling signal having a predetermined period;
delay the transmission signal where the first peak is suppressed by a predetermined time that corresponds to a period shorter than the predetermined period of the first sampling signal; and
suppress a second peak of the delayed transmission signal according to a second sampling signal having the predetermined period.

2. The peak suppression circuit according to claim 1, wherein the processor is further configured to:
detect timings of the first peak and the second peak which exceed predetermined threshold levels, respectively, among peaks of the transmission signal;
generate suppression signals having peaks in synchronization with the detected timings, respectively; and
synthesize the delayed transmission signal with the suppression signals, respectively.

3. The peak suppression circuit according to claim 1, wherein the processor is configured to:
suppress an (n−1)-th peak of the transmission signal according to an (n−1)-th sampling signal having the predetermined period,
delay the transmission signal where the (n−1)-th peak is suppressed by the predetermined time that corresponds to a period shorter than the predetermined period, and
suppress an n-th peak of the delayed transmission signal according to an n-th sampling signal having the predetermined period,
wherein the n is an integer of 2 or more.

4. The peak suppression circuit according to claim 3, wherein the predetermined time is a time having 1/n of a length of the predetermined period.

5. A peak suppression method comprising:
suppressing a first peak of a transmission signal according to a first sampling signal having a predetermined period;
delaying the transmission signal where the first peak is suppressed by a predetermined time that corresponds to a period shorter than the predetermined period of the first sampling signal; and
suppressing a second peak of the delayed transmission signal according to a second sampling signal having the predetermined period, by a processor.

6. A transmitter comprising:
a memory;
a processor coupled to the memory and the processor configured to:
suppress a first peak of a transmission signal according to a first sampling signal having a predetermined period;
delay the transmission signal where the first peak is suppressed by a predetermined time that corresponds to a period shorter than the predetermined period; and
suppress a second peak of the delayed transmission signal according to a second sampling signal having the predetermined period of the first sampling signal;
an amplifier configured to amplify the transmission signal where the second peak is suppressed; and
an antenna configured to transmit the transmission signal amplified by the amplifier.

* * * * *